Dec. 7, 1965   J. L. VANHEERENTALS   3,222,167
PROCESS FOR DETERMINING EXPOSURE AND DEVELOPING TIMES
Filed Aug. 23, 1963   2 Sheets-Sheet 1
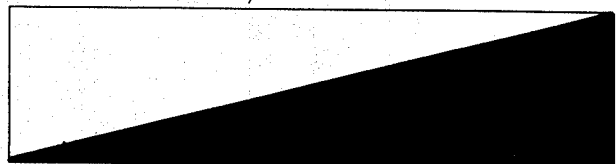
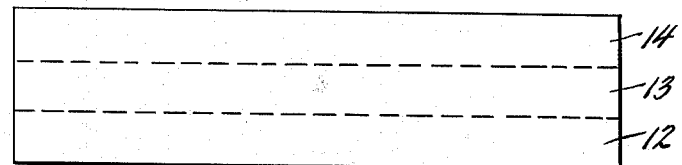
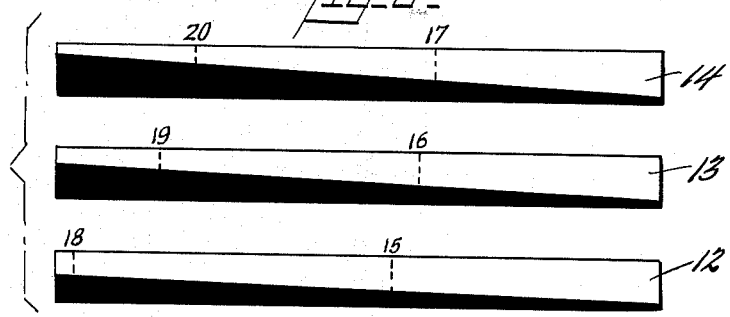
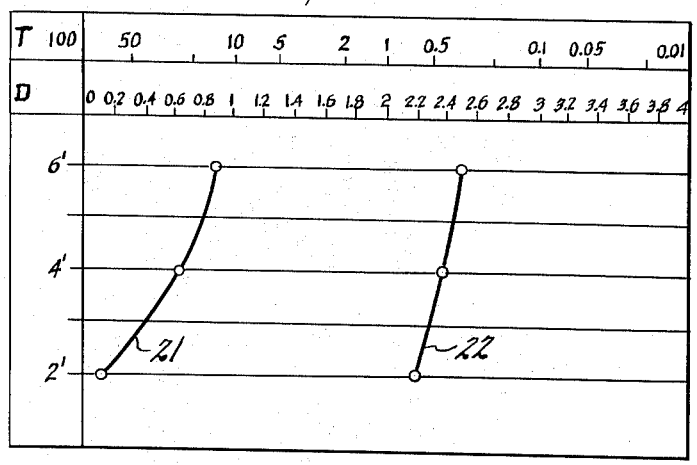
INVENTOR
J. L. Vanheerentals,
BY Watson, Cole, Grindle & Watson
ATTORNEYS

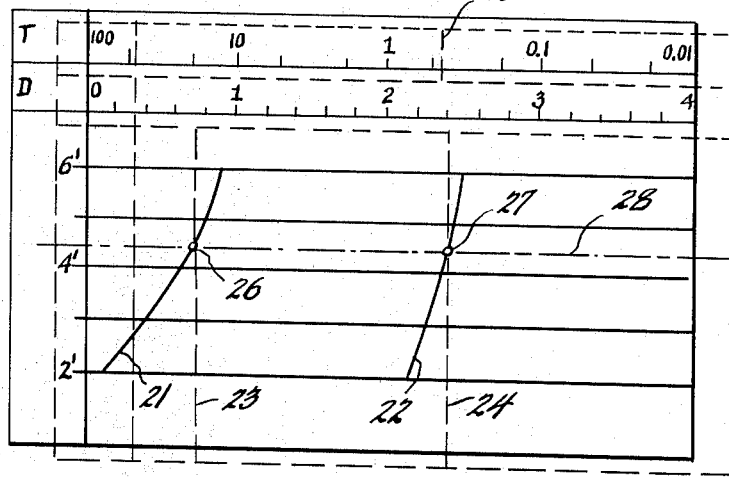

United States Patent Office 3,222,167
Patented Dec. 7, 1965

3,222,167
PROCESS FOR DETERMINING EXPOSURE AND DEVELOPING TIMES
Jacques Leon Vanheerentals, Wilrijk-Antwerp, Belgium, assignor to Gevaert Photo-Producten N.V., Mortsel-Antwerp, Belgium, a Belgian company
Filed Aug. 23, 1963, Ser. No. 306,962
Claims priority, application Netherlands, Aug. 27, 1962, 282,542
5 Claims. (Cl. 96—27)

The invention relates to a process for determining the exposure time and the developing time of photographic material, on which an original must be copied.

The expression "original" embraces a non-photographic original, i.e. any given object, from which a photographic print should be made, as well as a photographic original, more particularly such as a whether or not transparent colour or black-and-white positive or negative.

It is known, that in order to determine the required exposure and developing times a reprographer usually relies on his skill, considering, however, the nature of the original, the photographic film, the exposure and development conditions, and the intended results.

Since this is not simple, in practice several prints must often be made before attaining the intended results. Some reasons therefor happen to be the following.

The characteristics of the photographic material are not rectilinear. Hence, a calculation of the exact exposure and developing times with the help of a test exposure on account of the densitometry is impossible.

The characteristics of the photographic material differ from batch to batch and they depend on the storing time and on other factors.

The nature of the originals (maximum density and contrast range) is always different.

With the help of the minimum density and the contrast range measured on a test print, it is impossible to calculate the exposure and developing times yielding on the photographic material the desired minimum density and contrast value since the calculated times depend on each other.

The invention intends to provide an improved process for determining the exposure and developing times of a photographic material, said process taking all the above mentioned factors into account.

According to the invention, a method is provided for determining by means of a test exposure and a test development, the exposure and the development time of a photographic material onto which an original has to be reproduced, comprising the steps of making a test print by means of a wedge on at least three strips of a photographic material having the same characteristics as the one which will be used for making the reproduction, developing the said three strips for different development times, determining on either strip the point of maximum density and the point of minimum density, which are to be obtained in the final reproduction, transferring said points to a first nomograph where the axis of abscissas is a density scale corresponding to the wedge used for making the test prints and the axis of ordinates is a time scale indicating the development times, joining the points of minimum density and the points of maximum density on the said first nomograph so as to obtain an unbroken curve of minimum resp. of maximum density, marking on a second nomograph, where the axis of abscissas is a density scale corresponding to that of the first nomograph, the minimum and the maximum density of the original by means of two straight lines running parallel to the axis of ordinates, superposing both nomographs, relatively moving the nomographs in the direction of the axis abcscissas, both abscissas running parallel, so as to make the unbroken curves of the first nomograph intersect lines of the second nomograph in two points which are situated on a single straight line running parallel to the axis of abscissas, the point of intersection of the ordinate axis of the first nomograph with the said single straight line indicating the right developing time, and the relative shifting of either nomograph in the direction of the abscissas axis indicating on a logarithmic exposure scale of the first nomograph, which corresponds with the density scale, the factor by which the test exposure time must be multiplied in order to arrive at the correct exposure time.

According to a preferred embodiment of the invention, said test print is produced on at least three strips of photographic material by exposing one strip of said photographic material to the wedge and cutting said strip length-wise into at least three strips.

Nomographs for performing the method according to the invention may consist of two rectangular flexible transparent supports of very simple and appropriate form. Said supports enable the operator to apply required markings by means of a soft pencil, and later to remove said markings in an easy way. Said first support is provided with a rectangular system of coordinate axes, the axis of abscissas bearing a density scale from 0 to 4 and a corresponding logarithmic exposure scale indicating values from 100 to 0.01. The exposure value 100 coincides with the density value 0 and the exposure value 0.01 coincides with the density value 4. The axis of ordinates of said rectangular system carries a scale indicating development times from 2 to at least 6 minutes. Said second support is provided with a corresponding rectangular system of coordinate axes, the axis of abscissas bearing the same density scale from 0 to 4.

The invention will be further illustrated by a drawing in which an example is reproduced.

FIG. 1 schematically shows a continuous wedge which is used in the process according to the invention.

FIG. 2 shows an unexposed test strip.

FIG. 3 schematically shows the exposed and differently developed areas of the test strip.

FIG. 4 shows the first nomograph.

FIG. 5 shows the second nomograph.

FIG. 6 shows the superposed nomographs.

A test strip 10 (FIG. 2) of the photographic black-and-white film, on which a negative original must be printed in contact and the exposure and development times of which must be determined, is subjected to a 10 second test exposure through and while in contact with a transparent continuous grey-wedge 11 (FIG. 1) in the same conditions as those in which the exposure to the negative original will happen.

The black triangle on FIG. 1 is a schematic representation of the wedge. In reality the wedge consists of a 20.0 x 4 sq. cm. transparent rectangular support, which over its total breadth a density gradually increasing along its length (from left to right according to FIG. 1). The minimum density is 0, whereas the maximum density amounts to 4. The wedge constant is 0.2.

The exposed film strip 10 is length-wise divided into three strips 12, 13 and 14, which are developed for respectively 2, 4 and 6 minutes in the developer to be used later for the processing of the photographic film. Obviously the development conditions (temperature and agitation of the bath) must be the same as those during development of the copy of the negative original.

The strips are fixed and dried. The position of the points of minimum and maximum density desired in the print on the film are then determined on each strip.

These minimum and maximum density values are determined by the reprographer and depend on the purpose the print was made for. Technical purposes include, for example, the preparation of a positive print of the negative, the preparation of separation negatives of a positive colour original that should be multiplied by photomechanical reproduction techniques, of the preparation of correction masks for the side-absorptions of the dyes in the reproduction materials. In the present case these values are, respectively, 0.3 and 1.7.

The position of the points having the minimum density of 0.3 is marked on the three strips 12, 13 and 14 with, respectively, 15, 16 and 17.

The position of the points having the maximum density of 1.7 is marked on the three strips 12, 13 and 14 with, respectively, 18, 19 and 20.

These points are transferred to the first nomograph (FIG. 4).

The first nomograph comprises a foil of transparent material, on which in the direction of the axis of ordinates a time scale is provided indicating the development times, and on which in the direction of the axis of abscissas a density scale D is provided corresponding to the density course of the used wedge, and also a logarithmic scale T of relative exposure times, said logarithmic scale also corresponding with the wedge.

By a density scale corresponding with the wedge is meant the following. The continuous grey-wedge is characterized by a minimum density (in this case 0), a maximum density (in this case 4) and a wedge constant. The density scale of the nomograph has a same course as the density course of the wedge and the minimum and maximum values of the density scale are the same as those of the wedge.

By a scale for relative exposure times is meant the following. The scale is logarithmic and its maximum value 100 corresponds with the zero value of the density scale. The minimum value 0.01 corresponds with the value 4 of the density scale. It is clear that the exposure scale also must have a logarithmic course, because the density scale, which itself represents logarithmic values, is linear.

The test strip developed for 2 minutes is laid under this nomograph in such a way, that said test strip lies under the horizontal line corresponding to a development time of 2 minutes, and that the right side of the strip coincides with the right border of the nomograph. The position of points 18 and 15 is indicated on the horizontal line. The same treatment is repeated with both other test strips.

The points of maximum and minimum density are now joined on the nomograph so that a curve of maximum density 21 and a curve of minimum density 22 are formed.

The second nomograph consists of a transparent foil with identical dimensions as those of the first nomograph. A similar density scale D is also provided on this second nomograph (FIG. 5).

The minimum and the maximum density of the negative original are plotted on this second nomograph as two vertical lines 23 and 24. In the present example these density values amount to respectively 0.4 and 2.1.

A reference line 25 is further provided on the second nomograph said line being situated above the FIGURE 1 on the time scale T of the first nomograph, when both nomographs coincide. The purpose of this reference line will be explained later.

The second nomograph is posed on the first nomograph in such a way that both axes of abscissas coincide. This operation is represented in FIG. 6, in which the first nomograph is reproduced by means of drawn lines and the second nomograph by means of broken lines. Both nomographs normally coincide with their upper- and under-borders. For the sake of clearness, however, the second nomograph is drawn 4 mm. lower in FIG. 6.

Both vertical lines 23 and 24 of the second nomograph intersect the curves 21 and 22 of the first nomograph in two points of intersection. The second nomograph is moved to the left or to the right until both points of intersection are lying on a line parallel to the axis of abscissas. The thus obtained points of intersection are marked with 26 and 27. The horizontal line 28 running through these points indicates the correct development time i.e. 4'25" on the scale of the development times situated on the left. The reference line 25 of the second nomograph indicates the figure 0.45 on the time scale T of the first nomograph. This figure represents a coefficient by which the original exposure time should be multiplied to arrive at the correct exposure time. This exposure time is 0.45×10 sec.=4.5 sec.

To the figures of the time scale T may be given a significance of an absolute time value in seconds instead of that of a coefficient if desired. Therefore a mark is drawn on the second nomograph above the point indicating the original exposure time on the time scale T, when said second nomograph coincides with the first. After shifting the nomographs, the mark of the second nomograph has taken another position with respect to the time scale T of the first nomograph. This new position indicates on the time scale T the correct exposure time in seconds.

For this second process a mark has to be applied on the second nomograph for each exposure time. According to the first process, however, the reference mark 25 is applied on the nomograph itself and only the new position should be read after the shifting.

Self-evidently the exposure and development times for the test strip cannot wholly be chosen at random, but within reasonable limits they should approximate the times which should really be applied.

It can happen that the two points of intersection are not found on an horizontal line. This means that the used film and/or developer are not suited i.e. the gamma necessary to acquire the desired contrast range cannot be obtained for this particular film and developer at a developing time between 2 and 6 minutes.

If the distance between both vertical lines on the second nomograph is larger than the maximum horizontal distance of both curves of the first nomograph, it means that a soft-working film and/or a more soft-working developer must be used. By a soft-working development both points on each of the three film strips will be lying at greater distances from one another, so that both curves of the first nomograph will lie at a greater distance from each other. In the reverse case a hard-working film and/or a more hard-working developer must be used.

In the described example use was made of a continuous grey-wedge. It is clear that also a step wedge can be used. In that case, however, the accuracy is much less than if a continuous wedge is used.

It appears from the example, more definitely from FIGURES 4 and 6 that the curvature of the curves of minimum and maximum density 22, 21 is somewhat larger near the lower side than near the upper side. Therefore, the development time, determining the position of the middle point fo the curves, can advantagoeusly be chosen lower e.g. 3'30" instead of 4' so that the middle point will be lying lower on the graph. In the most bent part of the curves the points are lying more closely together so that the curves can be plotted more accurately. It is self-evidently, that the process according the invention is not restricted to the application of three different development times for the test exposure and that the accuracy increases if several different developing times are used.

Practice, however, proves that by the application of three different development times as described in the example, the accuracy of the process appears to be very satisfactory.

The example relates to the reproduction of a black-and-white original.

The process according to the invention, however, is also suited to be used for the reproduction of colour originals according to photomechanical reproduction methods. It is known that according to this method three separation negatives are made from the colour original on a black-and-white photographic material, i.e. a first separation negative which is exposed to the original through a red selection filter and which will be used for the manufacture of the cyan printing plate, a second separation negative, which is exposed to the original through a green selection filter and which will be used for the manufacture of the magenta printing plates, and a third separation negative, which is exposed to the original through a blue selection filter and which will be used for the manufacture of the yellow printing plate. From these three separation negatives are then prepared the separation positives and from these separation positives the etching films. Finally the printing plates are made with the aid of these etching films.

The correct exposure and development times of the separation negatives can now also be determined according to the process of the invention. Three test strips are exposed behind the red, the green and resp. the blue selection filter. Each test strip is then cut into three parts and each part is developed for a different time. The further treatment is carried out as described above, on the understanding that a set of nomographs is used for the red selection, one for the green selection and one for the blue selection.

In the example the exposure of the test strip was performed while in contact with the wedge. During the exposure of the test strip to the wedge by projection, care should be taken that the camera or the enlarging apparatus are set to scale 1/1 so that the dimensions of the test strips to be prepared would correspond to those of the wedge, and would fit on the density scale of the nomographs. When then the required print has to be made on a scale deviating from 1/1, the indicated exposure time found according to the process of the invention must be adapted yet to the desired reduction or enlargement.

The example relates to the reproduction of a transparent original and therefore, use is made of a transparent wedge. If opaque originals are to be reproduced, it is evident that an opaque wedge e.g. on a paper or a cardboard support can be used.

In the present invention the word "nomograph" should be understood in its widest significance. Thus, one is not limited to the application of both transparent flexible supports having the dimensions given in the example. It is possible e.g. to manufacture the nomographs from a plate of a hard transparent substance such as organic glass, polystyrene, etc.

Both nomographs can then be attached to each other preferably by means of a suitable device, in such a way that they are able to move with respect to each other in the direction of the axis of abscissas. The second nomograph may eventually be formed by a flat member on which two normal and parallel elements can be moved (compare with the sliding claw of the vernier calipers). The flat member must carry a density scale and both sliding elements should accomplish the function of both vertical lines 23 and 24 (FIG. 5).

According to the example the exposed test strip is cut into three parts which are to be developed differently.

It can be stated that, in exceptional cases in consequence of the cutting, very narrow strips may behave in a different way, in a developing bath e.g. agitated by nitrogen, than strips or sheets of larger dimensions. The strips are violently agitated thereby causing a stronger development, i.e. density, than that of the film sheet where a copy will be made on. In other words under such circumstances, the developing conditions are not identical and it is impossible to apply the process according to the invention in a reliable manner. It is recommended, therefore, against working with too narrow test strips. The wedge will preferably be exposed on three different test strips, which will be developed for different times. Finally, a particular application of the process according to the invention consists in determining by means of a test strip, those limits within which the contrast range of the original may vary in order to be able to be reproduced with a determined contrast range on the photographic material by means of which the test print was made.

Therefore, the second nomograph is placed on the first nomograph, and shifted to the left or to the right until the vertical line of the density 0 of the second nomograph coincides with the point of intersection of the curve 21 with the horizontal line through point 6' of the first nomograph. A vertical line on the second nomograph lying coinciding with the point of intersection of curve 22 and the horizontal line through point 6' of the first nomograph, indicates on the density scale D of the second nomograph, the minimum value of the contrast range of the original, in the case being 1.6.

The same is performed with respect to points of intersection of curves 21 and 22 with the horizontal line through point 2' of the first nomograph. A maximum value of the contrast range of the original is found viz. 2.05.

In other words the minimum contrast range, which can be reproduced, is found by subtracting the densities indicated by the points of intersection which are formed by both curves 21, 22 and the 6-minutes horizontal line (2.45−0.85=1.6). The maximum contrast range which can be reproduced is determined in the same way by subtracting the densities indicated by the points of intersection formed by both curves 21, 22 and the 2-minutes horizontal line (2.2−0.15=2.05).

It means that each original having a contrast range between 1.6 and 2.05 can be reproduced truly on the photographic material, on which the test print was made.

When the nomographs are entirely elaborated for different combinations of film and developer, one can immediately check by means of the minimum and maximum contrast ranges found on each nomograph, which combination is most suited for the reproduction of a particular original.

I claim:

1. Method for determining by means of a test exposure and a test development, the light exposure and the developing time of a photographic material onto which an original has to be reproduced, which method comprises the steps of making a test print by means of a wedge gradually varying in optical density from one end to the other on at least three strips of a photographic material, the characteristics of which are essentially the same as the material to bear the reproduction, photographically developing the said three strips for different developing times, determining on each strip the point of maximum density and the point of minimum density which are to be attained in the final reproduction, plotting said points to a first nomograph where the axis of abscissas is a density scale corresponding to the wedge used for making the test prints and the axis of ordinates is a time scale of developing times, joining on the said first nomograph the points of minimum density and the points of maximum density so as to obtain a continuous curve for both minimum and maximum density, indicating on a second nomograph, where the axis of abscissas is a density scale corresponding to that of the first nomograph, the minimum and the maximum density of the original by means of two straight lines running parallel to the axis of ordinates, adjusting the general position of the nomographs in the direction of the axis of abscissas, while the same are in superposed relation with their abscissas parallel, so as to make the two curves of the first nomograph intersect the straight lines of the second nomograph at two points lying on a straight line extending parallel to the axis of abscissas, the point of intersection of the ordinate axis of the first nomograph by the said last-mentioned straight line indicating the right developing time, and the relative shift in position of both nomographs in the direction of the abscissa axis indicating on a logarithmic exposure scale of the first nomograph, which exposure scale corresponds with the density scale, the factor by which the test exposure time must be multiplied in order to attain the correct exposure time.

2. Method according to claim 1, wherein the said test print on at least three strips of photographic material, is produced by exposing one strip of said photographic material to the wedge, and by cutting thereafter the said strip lengthwise into at least three strips.

3. Method according to claim 1, wherein the value of the intermediate developing time between the extremes of the said three developing times, is so chosen as to approach more closely the smallest rather than the greatest value of said developing times, so as to permit a more exact representation of the curved lower part of said continuous curves for minimum and maximum densities on the first nomograph.

4. Method according to claim 1, comprising the use of a continuous wedge.

5. Method according to claim 1, comprising the use of a step-wedge.

References Cited by the Examiner

UNITED STATES PATENTS

| 2,337,534 | 12/1943 | Barber | 96—27 |
| 3,018,552 | 1/1962 | Adams | 33—1 |

OTHER REFERENCES

Clerc: Photography Theory and Practice, 2nd Ed., pp. 360–364 (1937).

NORMAN G. TORCHIN, *Primary Examiner.*